US012352082B2

(12) United States Patent
Jung

(10) Patent No.: US 12,352,082 B2
(45) Date of Patent: Jul. 8, 2025

(54) HANDLE ASSEMBLY WITH A POP-IN COVER FOR A VEHICLE

(71) Applicants: HYUNDAI MOTOR COMPANY, Seoul (KR); KIA CORPORATION, Seoul (KR)

(72) Inventor: Se-Hoon Jung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/982,835

(22) Filed: Nov. 8, 2022

(65) Prior Publication Data

US 2023/0332443 A1 Oct. 19, 2023

(30) Foreign Application Priority Data

Apr. 13, 2022 (KR) ........................ 10-2022-0045659

(51) Int. Cl.
*E05B 85/10* (2014.01)

(52) U.S. Cl.
CPC .................................. *E05B 85/103* (2013.01)

(58) Field of Classification Search
CPC ............................. E05B 85/103; E05B 85/107
See application file for complete search history.

(56) References Cited

U.S. PATENT DOCUMENTS 5,560,659 A * 10/1996 Dault ........................ E05B 85/18 292/336.3
2006/0273088 A1* 12/2006 Burkat .................. E05B 85/107 220/212.5
2010/0007463 A1* 1/2010 Dingman ................ E05B 81/78 340/425.5
2015/0315812 A1* 11/2015 Vasi ........................ E05B 81/08 292/336.3
2016/0138307 A1* 5/2016 Pohl ........................ E05B 81/76 292/336.3
2021/0172209 A1* 6/2021 Chen ........................ E05B 85/14
2021/0332619 A1* 10/2021 Peterson .............. B60Q 1/2669

FOREIGN PATENT DOCUMENTS

DE 2243538 * 3/1974
KR 20160044952 A 4/2016

* cited by examiner

*Primary Examiner* — Gregory J Strimbu
(74) *Attorney, Agent, or Firm* — Lempia Summerfield Katz LLC

(57) ABSTRACT

A door for a vehicle includes: an external panel forming an appearance surface of the door, an operation groove and a handle assembly; the handle assembly includes a handle installed on the external panel to close a first part of the operation groove, a cover rotatably installed on the external panel and configured to close a second part of the operation groove so as to fully close the operation groove, and a cover closing member to rotate the cover to close the second part of the operation groove. When the cover closes the second part of the operation groove, the cover is flush with the external panel and the handle without protruding beyond the external panel and the handle.

11 Claims, 6 Drawing Sheets

HANDLE ASSEMBLY WITH A POP-IN COVER FOR A VEHICLE

CROSS-REFERENCE TO RELATED APPLICATION

This application claims priority to and the benefit of Korean Patent Application No. 10-2022-0045659, filed on Apr. 13, 2022, which is incorporated herein by reference in its entirety.

BACKGROUND

Field

The present disclosure relates to a handle for a vehicle configured to open and close an opening/closing unit for a vehicle, and more specifically, to a cover pop-in type handle for a vehicle, which may have a cover located on the same surface as an external panel while a vehicle is parked or traveling, and may be stored in an opening/closing unit while the handle is operated.

Description of Related Art

A handle operates to open and close an opening/closing unit and is mounted on the opening/closing unit, such as a door, a trunk lid, or a tailgate of a vehicle.

For example, the handle is mounted on the door of the vehicle to pull the door when a driver or a passenger gets on the vehicle from the outside.

As shown in FIGS. 1 and 2, door handles 112A, 112B protrude from a door panel 111 so that the passenger may hold and operate the door handles 112A, 112B. When a door latch is released by the door handles, the passenger may open the door 110 to get on the vehicle by pulling the door handles 112A, 112B.

However, since the door handles 112A, 112B are formed to protrude from the door panel 111, and also formed with a space to put the passenger's hand, they are disadvantageous in aerodynamic performance.

In particular, in eco-friendly vehicles such as electric vehicles, a maximum driving range on single charge is a major factor in evaluating the driving performance of the vehicle. Accordingly, as shown in FIG. 3, an auto-flush type door handle 112C has been contemplated to improve the aerodynamic performance of the vehicles. The auto-flush type door handle 112C is nested inside the door panel 111 while a vehicle is parked or traveling, and thus has no stepped portion between the door panel 111 and the auto-flush type door handle 112, whereas the auto-flush type door handle 112C automatically protrudes from the door panel 111 when the passenger gets on/off the vehicle so that the passenger holds and operates the door handle 112C. In other words, the auto-flush type door handles automatically extend out for use and retract flush to an outer panel of the vehicle body when not in use. However, the auto-flush type door handle 112C is structurally complicated due to increased number of parts required for operating the auto-flush type door handles, thereby causing an increase in cost and a decrease in durability.

Meanwhile, as shown in FIG. 4, a pop-out type door handle 112D allows a user to press one side of the door handle 112D so that the other side protrudes and thus the user pull the door handle 112D to open the door. This pop-out type door handle 112D is applied to some other vehicles. Since this is usually manually operated, the structure is simple, but there is a problem in that the wrist should be bent at operation, and it is not easy to secure a space in the hand may be put because an interval c with the door panel 111 is small.

SUMMARY

The present disclosure provides a handle assembly having a pop-in type cover for a vehicle, which allows an operation to be easy when an opening/closing unit is opened and closed while maintaining a state of having a simple structure, and having a continuous plane without a stepped portion with an external panel of a vehicle while a vehicle is traveling or parked.

In one embodiment of the present disclosure, a handle assembly for a vehicle includes: an external panel formed with an operating groove and configured to form an appearance of an opening/closing unit installed in the vehicle to be openable and closable; and a handle installed on the external panel to close a part of the operation groove; and a pop-in type cover rotatably installed on the external panel and configured to close the rest part of the operation groove by rotation. The handle assembly further includes a cover closing member that rotates the pop-in type cover to close the rest part of the operation groove. In particular, the pop-in type cover is flush with the external handle and the handle without a stepped portion. In other words, when the pop-in type cover closes the rest part of the operation groove, the pop-in type cover forms a continuous plan with the external handle and the handle without a stepped portion.

The pop-in type cover is rotatably installed on the external panel. In particular, the pop-in type cover (hereinafter, "the cover") rotates around a hinge shaft as a center of rotation, and the cover closing member is configured to operate the cover to close the rest part of the operation groove by an elastic force.

The cover includes a cover portion configured to cover the rest part of the operation groove, and an operation portion extending from an end of the cover portion and connected to the cover closing member. In particular, the hinge shaft is installed at a portion where the cover portion and the operation portion are connected.

The cover closing member is a spring configured to elastically support the operation portion so that the cover closes the operation groove.

The handle assembly further includes a cover opening member configured to operate the cover so that the cover is stored or nested in the operation groove. In particular, an operation force by which the cover opening member opens the cover is greater than an operating force of the cover closing member.

The cover opening member is a solenoid configured to rotate the cover by expansion and contraction.

In another embodiment, an inner case configured to finish an inner surface of the operation groove is formed inside the operation groove.

When the cover is opened, the inner case is formed to be inclined to support the inner surface of the cover.

When the cover closes the operation groove, a holder configured to fix one end of the cover is formed so that the cover maintains a continuous plane without a stepped portion with the external panel and the handle.

The holder is formed to be concave on a portion extending from the external panel into the opening/closing unit, and when the cover forms the continuous plane with the external panel and the handle, an outer end of the cover is accommodated in the holder to fix the cover.

When the opening/closing unit is unlocked, the cover opening member is operated so that the cover opens the operation groove.

The cover is disposed on at least any one of upper and lower portions of the handle.

The opening/closing unit is a door for a vehicle, and the handle is a door handle held by a passenger when the door is opened and closed.

According to the handle assembly (namely, a pop-in type handle assembly) for a vehicle according to the present disclosure having the above configuration, the pop-in type cover can form the continuous plane without the stepped portion with the external panel of the opening/closing unit and the handle, thereby reducing the air resistance while a vehicle travels, and making the appearance look beautiful while a vehicle is parked.

In addition, the passenger can hold the door handle with only the operation in which the passenger puts into the hand at operation, and the space in which the passenger can put the hand becomes sufficient.

In addition, the passenger can operate the handle in the same manner as the conventional handle without bending the wrist when operating the handle, and thus the operation becomes convenient.

BRIEF DESCRIPTION OF THE DRAWINGS

In order that the disclosure may be well understood, there will now be described various forms thereof, given by way of example, reference being made to the accompanying drawings, in which.

Figure 1:
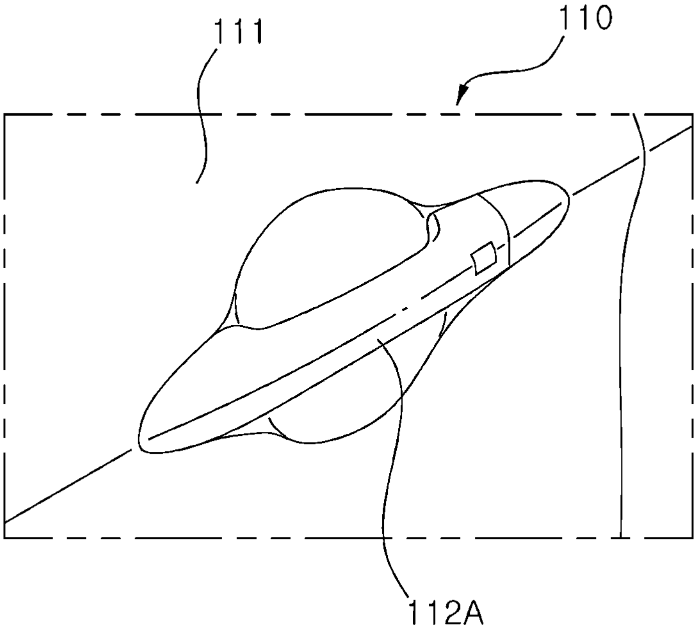
FIG. 1 (PRIOR ART)
FIGS. 1 to 4 are each perspective diagrams showing an example of a door handle according to the related art.
Figure 2:
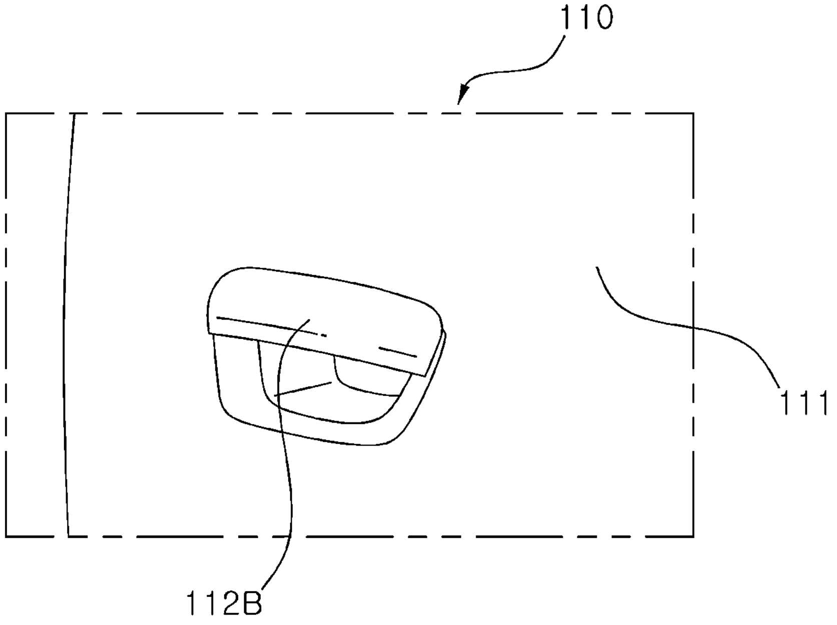
FIG. 2 (PRIOR ART)
Figure 3:
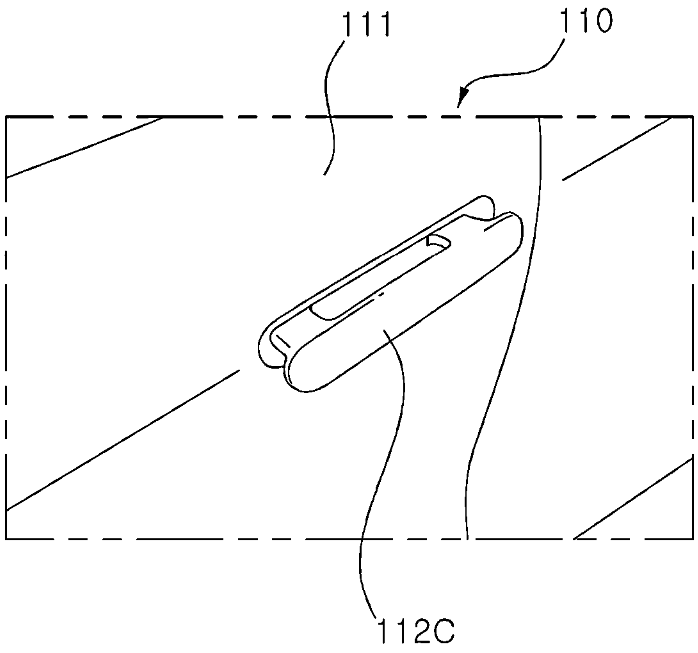
FIG. 3 (PRIOR ART)
Figure 4:
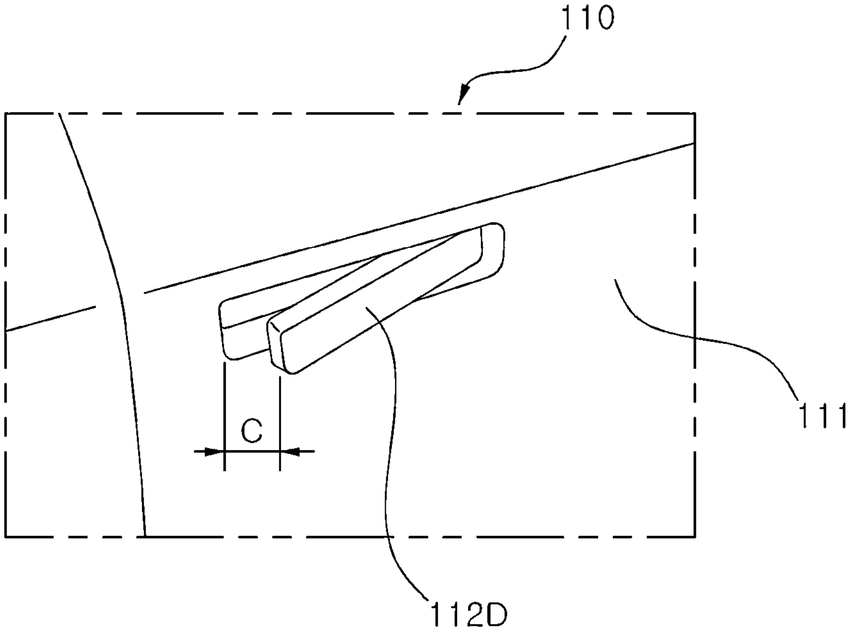
FIG. 4 (PRIOR ART)

The drawings described herein are for illustration purposes only and are not intended to limit the scope of the present disclosure in any way.

DETAILED DESCRIPTION

Hereinafter, a pop-in type handle assembly (hereinafter "a handle assembly") for a vehicle according to the present disclosure is described in detail with reference to the accompanying drawings.

The handle assembly for a vehicle according to the present disclosure includes: an external panel 11 formed with an operation groove 11*a* and configured to form an appearance of an opening/closing unit installed in the vehicle to be openable/closable, a handle 12 installed on the external panel 11 to close a part of the operation groove 11*a*, and a pop-in type cover 22 (hereinafter "the cover") rotatably installed on the external panel 11 and configured to close the rest part of the operation groove 11*a* by rotation. The handle assembly further includes a cover closing member 24 that rotates to cause the cover 22 (i.e., the pop-in type cover) to close the operation groove 11*a*. When the cover 22 closes the operation groove 11*a* (e.g., the rest part of the operation groove), the cover 22 is flush with the external panel 11 and the handle 12. In other words, the cover forms a continuous plan with the external panel 11 and the handle 12 without having a stepped portion or a outwardly protruding portion.

Hereinafter, a case in which the opening/closing unit is a door 10 through which a passenger may get on and off, and the handle 12 is the door handle 12 held by the passenger to open and close the door 10 is described as an example.

The door 10 is formed by bonding a plurality of panels, and among them, the door panel 11 installed outside the door 10 is formed with the operation groove 11*a*. The door panel 11 forms an appearance of the door 10. The operation groove 11*a* formed in the door panel 11 forms a space into which the passenger's hand may be put when the door 10 is opened and closed.

A portion of the door panel 11 where the operation groove 11*a* is formed is finished with an inner case 21. The inner case 21 is formed to be concave toward the inside, and the circumference thereof is bonded to the door panel 11, thereby finishing the portion of the door panel 11 where the operation groove 11*a* is formed.

The inner case 21 is formed to be inclined toward the inside from the door panel 11. The inner case 21 is formed to be inclined, so that when the passenger puts the hand into the operation groove 11*a* to operate the door handle 12, the hand is naturally induced to hold the door handle 12. In addition, the inner case 21 supports an inner surface of the cover 22 when the cover 22 is opened.

The door handle 12 is installed on the door panel 11 to partially close the operation groove 11*a*. For example, both ends of the door handle 12 are respectively fixed to the door panel 11, and the rest of the door handle 12 is installed to cross the operation groove 11*a*. The door handle 12 allows the passenger to hold the door handle 12 when the door 10 is opened and closed, so that the passenger opens and closes the door 10.

The cover 22 covers the operation groove 11*a*. A portion of the operation groove 11*a* excluding the door handle 12 is exposed to the outside, impairing the aesthetic sense, and causing an air resistance due to the operation groove 11*a*. The cover 22 covers the rest of the operation groove 11*a* that is not closed by the door handle 12, so that the outer surfaces of the door panel 11 and the door handle 12 form a continuous plane.

The cover 22 is rotatably installed on the door panel 11. The cover 22 covers the operation groove 11*a* while a vehicle is traveling or parked, so that the outer surfaces of the door panel 11, the cover 22, and the door handle 12 form the continuous plane without stepped portions. When the door 10 is opened and closed, the cover 22 is rotated to expose the operation groove 11*a*, so that the passenger may put the hand into the operation groove 11*a* to hold the door handle 12.

The cover 22 includes a cover portion 22*a* covering the operation groove 11*a*, and an operation portion 22*b* extending from an end of the cover portion 22*a*. And the operation portion 22*b* is connected to the cover closing member 24.

A hinge shaft 23 is installed to pass through a portion where the cover portion 22*a* and the operation portion 22*b* are connected, so that the cover 22 may be rotated. The hinge shaft 23 is installed on a bracket (reference numeral not indicated) installed on the door panel 11 and the like, and the cover 22 is installed on the hinge shaft 23, so that the cover 22 may be rotated in the door panel 11.

When the cover portion 22*a* of the cover 22 closes the operation groove 11*a*, a holder 11*b* is formed on one side of the door panel 11 so that the cover portion 22*a* maintains the continuous plane with the door panel 11 and the door handle 12. The holder 11*b* is formed to be concave on a portion where a part of the door panel 11 is formed to extend into the door 10. When the cover portion 22*a* forms the continuous plane with the door panel 11 and the door handle 12, an outer end of the operation portion 22*b* is inserted into the holder 11*b*, so that the cover 22 is not rotated and the holder 11*b* maintains the state.

The cover closing member 24 is operated so that the cover 22 closes the operation groove 11*a* while a vehicle is parked or traveling. The cover closing member 24 allows the cover portion 22*a* to close the operation groove 11*a* so that the operation groove 11*a* is not exposed, thereby making the appearance look beautiful while a vehicle is parked, and reducing the air resistance while a vehicle travels.

Figure 5:
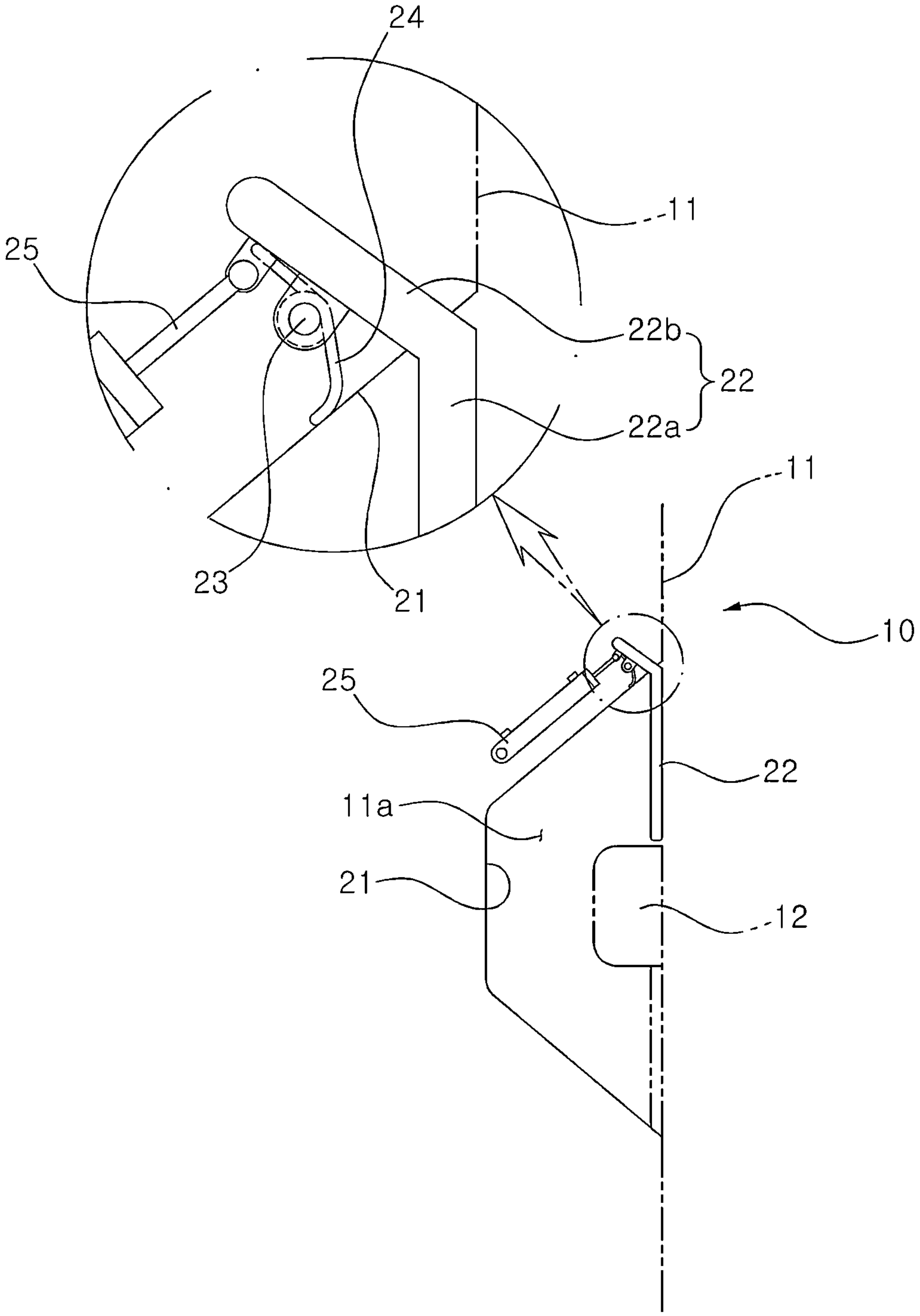
FIG. 5 is a schematic diagram showing a normal state of a cover pop-in type handle for a vehicle according to one embodiment of the present disclosure.
Figure 6:
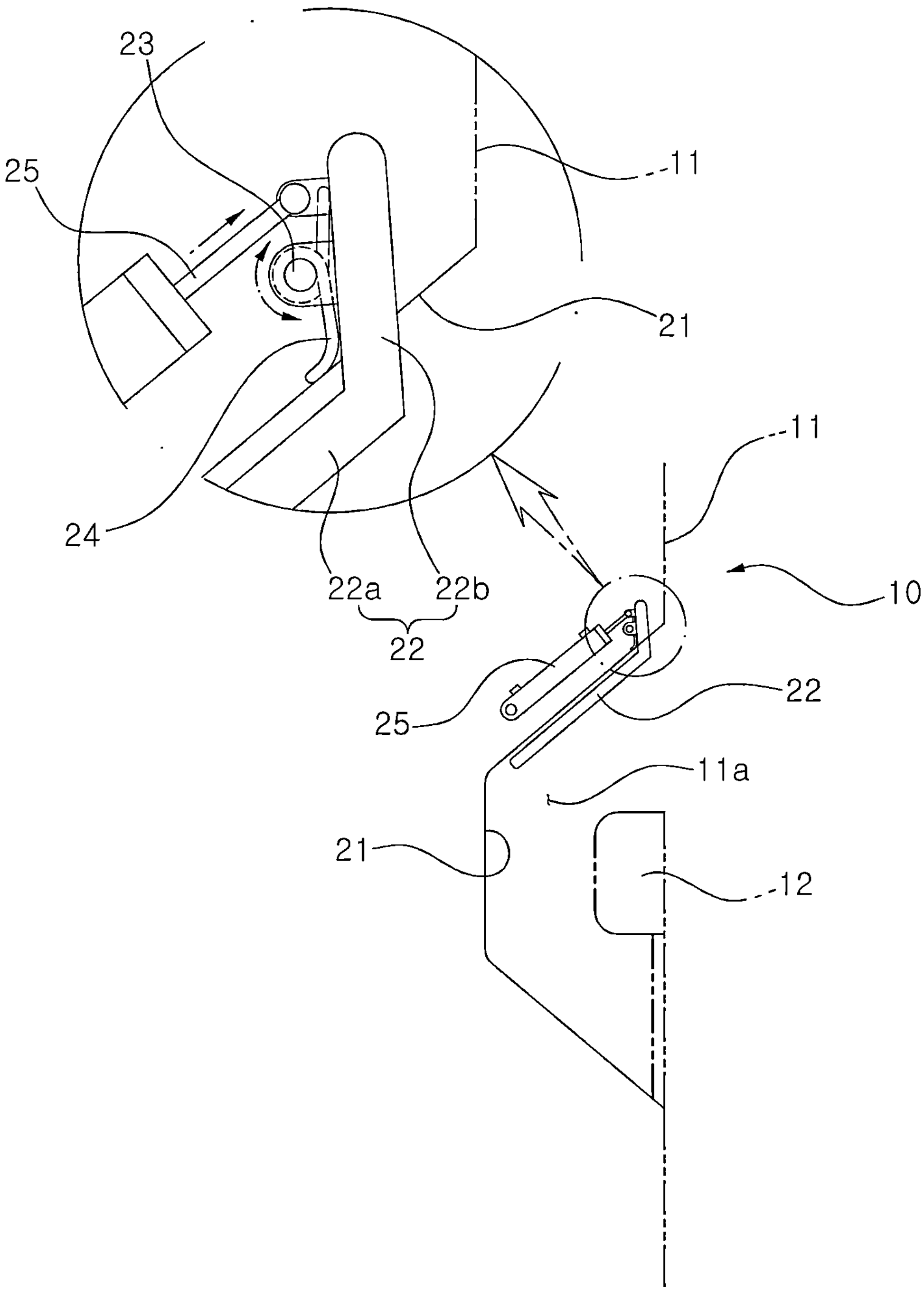
FIG. 6 is a schematic diagram showing an operating state of the cover pop-in type handle for a vehicle according to one embodiment of the present disclosure.
Figure 7:
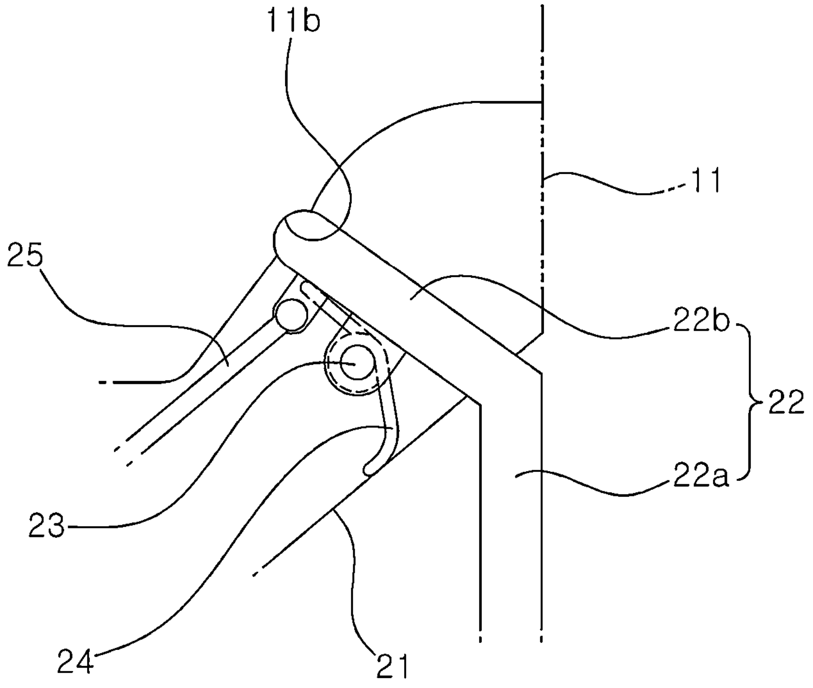
FIG. 7 is an enlarged diagram of major parts of the cover pop-in type handle for a vehicle according to one embodiment of the present disclosure.

In one embodiment, the cover closing member 24 is a spring 24 configured to elastically support the operation portion 22*b* so that the cover 22 closes the operation groove 11*a*. The spring 24 provides an operating force, that is, an elastic force, by which the cover 22 closes the operation groove 11*a*. As an example of the spring 24, a torsion spring as shown in FIGS. 5 to 7 may be provided. The torsion spring 24 is installed to wind the hinge shaft 23, one end of the torsion spring 24 is fixed to the cover 22, and the other end of the torsion spring 24 is fixed to the door panel 11, so that the cover 22 closes the operation groove 11*a* in a state in which the external force is not operated. The spring 24 may be provided as a coil spring having one end connected to the operation portion 22*b* of the cover 22, and the other end connected to the door panel 11.

As the cover closing member 24 is provided as the spring 24, even when a cover opening member 25 to be described later is not operated, the passenger may also press the cover 22 by the hand to operate the handle 12.

The cover opening member 25 provides the operating force for the cover 22 to open the operation groove 11*a*. The cover opening member 25 and the cover closing member 24 provide the operating forces to rotate the cover 22 in opposite directions to each other. The cover closing member 24 is provided as the spring 24 to provide the operating force for the cover 22 to close the operation groove 11*a* by a constant operating force at all times. On the other hand, the cover opening member 25 provides the operating force only while the cover 22 intends to open the operation groove 11*a*, and the operating force is greater than the operating force of the cover closing member 24. This is because the cover opening member 25 should rotate the cover 22 while the operating force of the cover opening member 25 overcomes the operating force of the cover closing member 24.

When the door 10 is unlocked, the cover opening member 25 is operated so that the cover 22 opens the operation groove 11*a* as an operation signal is input to the cover opening member 25. Thereafter, when the door 10 is locked again or when a shift stage of the vehicle is set to a stage D, the operation signal is blocked from being input to the cover opening member 25, and the cover 22 closes the operation groove 11*a* again by the cover closing member 24.

As an example of the cover opening member 25, a solenoid 25 installed on one side of the door panel 11, and configured to rotate the operation portion 22*b* while expanded and contracted may be provided. A length of the solenoid 25 is increased or decreased to rotate the operation portion 22*b*, thereby rotating the cover 22.

In another embodiment, the cover opening member 25 may be provided as a motor. The motor may fix the hinge shaft 23 and the cover 22, so that the motor may also rotate the hinge shaft 23 to rotate the cover 22.

An operation of the handle assembly having the pop-in type cover 22 for a vehicle according to the present disclosure having the above configuration is described as follows.

Since the cover opening member 25 is not operated while the vehicle is parked or traveling, the cover 22 closes the operation groove 11*a* by the cover closing member 24. The cover closing member 24 continuously provides the operating force at which the cover portion 22*a* closes the operation groove 11*a*.

In particular, since an end of the operation portion 22*b* is inserted into the holder 11*b*, the cover portion 22*a* maintains the continuous plane with the door panel 11 and the door handle 12 while closing the operation groove 11*a*. When the end of the operation portion 22*b* is not fixed to the holder 11*b*, the cover portion 22*a* does not form the continuous plane with the door panel 11 and the door handle 12 due to the vibration of the cover 22, but the operation portion 22*b* is fixed to the holder 11*b* to form the continuous plane with the door panel 11 and the door handle 12.

Meanwhile, when the door 10 is unlocked, the operation signal is applied to the cover opening member 25 so that the cover opening member 25 rotates the operation portion 22*b*. Accordingly, as the entire cover 22 rotates, the cover portion 22*a* opens the operation groove 11*a*. When the operation groove 11*a* is opened, the passenger puts the hand into the operation groove 11*a* to hold the door handle 12 to open the door.

Figure 8:
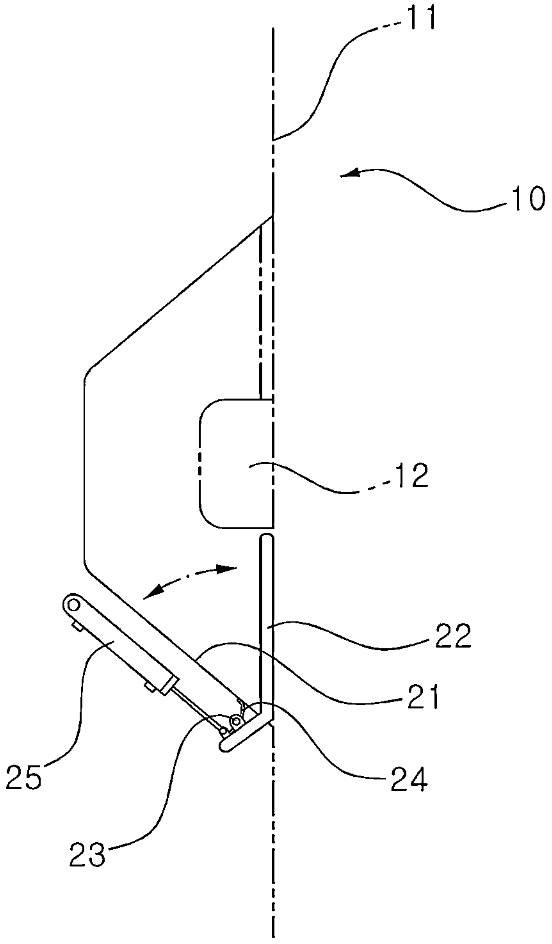
FIG. 8 is a schematic diagram showing a cover pop-in type handle for a vehicle according to another embodiment of the present disclosure.

FIGS. 5 to 7 show an example in which the cover 22 is located above the door handle 12, but as shown in FIG. 8, the cover 22 may also be located under the door handle 12. At this time, not only the cover 22, but also other components are located and installed accordingly.

In addition, the cover 22 may also be formed above and under the door handle 12, respectively.

In addition, an example in which the opening/closing unit is the door 10 for the vehicle, and the handle 12 is the door handle 12 configured to open and close the door has been described above, but may also be applied to other opening/closing units may also be applied. For example, the opening/closing unit may be a tailgate, and the handle 12 may be a tailgate handle configured to open and close the tailgate.

What is claimed is:

1. A handle assembly for a vehicle, the handle assembly comprising:

an external panel forming an appearance surface of an opening and closing unit installed in the vehicle, wherein the opening and closing unit is configured to be openable and closable, and the external panel includes an operation groove;

a handle installed on the external panel and configured to close a first part of the operation groove;

a cover rotatably installed on the external panel, and configured to close a second part of the operation groove so as to fully close the operation groove when the cover rotates to close the second part of the operation groove and a first end of the cover contacts the handle; and a cover closing member configured to rotate the cover to close the second part of the operation groove, wherein when the cover closes the second part of the operation groove, the cover is flush with the external panel and the handle without protruding beyond the external panel and the handle, wherein a holder is formed in a portion of the external panel that extends toward an inside of the opening and closing unit and is configured to hold a second end of the cover when the cover closes the second part of the operation groove such that the cover is flush with the external panel and the handle without protruding beyond the external panel and the handle, wherein the holder is concave toward the inside of the opening and closing unit and the second end of the cover is convex toward the inside of the opening and closing unit such that the holder is configured to accommodate and hold the second end of the cover when the cover closes the second part of the operation groove, and wherein the holder has a curvature that matches a curvature of the second end of the cover.

2. The handle assembly of claim 1, wherein the cover is configured to rotate around a hinge shaft as a center of rotation.

3. The handle assembly of claim 2, wherein the cover includes;

a cover portion configured to cover the second part of the operation groove; and an operation portion extending from the cover portion and connected to the cover closing member, and wherein the hinge shaft is installed on the opening and closing unit and the hinge shaft passes through the cover.

4. The handle assembly of claim 3, wherein the cover closing member is a spring configured to elastically support the operation portion of the cover so that the spring biases the cover in a direction to close the second part of the operation groove.

5. The handle assembly of claim 3, further comprising:

a cover opening member configured to open the cover such that the cover is disposed in the operation groove, wherein an opening operation force by which the cover opening member opens the cover is greater than a closing operating force of the cover closing member.

6. The handle assembly of claim 5, wherein the cover opening member is a solenoid configured to rotate the cover.

7. The handle assembly of claim 5, wherein when the opening and closing unit is unlocked, the cover opening member is operated to open the cover.

8. The handle assembly of claim 1, further comprising:

an inner case forming an inner surface of the operation groove.

9. The handle assembly of claim 8, wherein the inner case is angled with respect to the external panel to support an inner surface of the cover when the cover is opened.

10. The handle assembly of claim 1, wherein the cover is disposed above or below the handle.

11. The handle assembly of claim 1, wherein the opening and closing unit is a door of the vehicle, and the handle is a door handle held by a passenger when the door is opened and closed.

* * * * *